US009507761B2

(12) United States Patent
Tripp

(10) Patent No.: US 9,507,761 B2
(45) Date of Patent: Nov. 29, 2016

(54) COMPARING WEBPAGE ELEMENTS HAVING ASYNCHRONOUS FUNCTIONALITY

(71) Applicant: International Business Machines Corporation, Armonk, NY (US)

(72) Inventor: Omer Tripp, Har Adar (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 170 days.

(21) Appl. No.: 14/140,927

(22) Filed: Dec. 26, 2013

(65) Prior Publication Data

US 2015/0186342 A1    Jul. 2, 2015

(51) Int. Cl.
*G06F 17/00*    (2006.01)
*G06F 17/22*    (2006.01)
*G06F 17/30*    (2006.01)

(52) U.S. Cl.
CPC ..... *G06F 17/2247* (2013.01); *G06F 17/30598* (2013.01); *G06F 17/30861* (2013.01); *G06F 17/30864* (2013.01)

(58) Field of Classification Search
CPC ................................. G06F 17/30864
USPC ........................... 715/205; 707/E17.108, 709
See application file for complete search history.

(56) References Cited

U.S. PATENT DOCUMENTS

| | | | |
|---|---|---|---|
| 2006/0230011 A1 | 10/2006 | Tuttle et al. | |
| 2008/0091685 A1* | 4/2008 | Garg | G06F 17/30864 |
| 2008/0177848 A1* | 7/2008 | Wakhlu | G06Q 10/107 |
| | | | 709/206 |
| 2009/0198662 A1* | 8/2009 | Prabhakar | G06F 17/30864 |
| 2009/0288099 A1* | 11/2009 | Rybak | G06F 17/30864 |
| | | | 719/313 |
| 2010/0088668 A1 | 4/2010 | Yoshihama et al. | |
| 2011/0066609 A1 | 3/2011 | Ashkenazi et al. | |
| 2011/0173178 A1 | 7/2011 | Conboy et al. | |
| 2012/0109931 A1* | 5/2012 | Prasad | G06F 11/3672 |
| | | | 707/709 |
| 2012/0131428 A1 | 5/2012 | Tsai et al. | |
| 2012/0284270 A1 | 11/2012 | Lee | |
| 2012/0331372 A1 | 12/2012 | Scoda et al. | |
| 2014/0101235 A1* | 4/2014 | Smedberg | G06F 17/2235 |
| | | | 709/203 |

FOREIGN PATENT DOCUMENTS

CN    102609518    7/2012

OTHER PUBLICATIONS

Benjamin et al., "A Strategy for Efficient Crawling of Rich Internet Applications", Web Engineering Lecture Notes in Computer Science vol. 6757, 2011, pp. 74-89.
Choudhary et al., "Crawling Rich Internet Applications: The State of the Art", CASCON '12 Proceedings of the 2012 Conference of the Center for Advanced Studies on Collaborative Research, pp. 146-160.
Mesba et al., "Crawling AJAX by Inferring User Interface State Changes", Delft University of Technology Software Engineering Research Group, Technical Report Series, Report TUD-SERG-2008-022, 2009.

\* cited by examiner

*Primary Examiner* — Mohammed-Ibrahim Zuberi
(74) *Attorney, Agent, or Firm* — Cantor Colburn LLP; Maeve Carpenter

(57) ABSTRACT

Techniques for determining differences between document object models (DOMs) received in response to asynchronous functionality calls is described herein. The techniques may include clustering elements in a webpage having asynchronous functionality. The techniques include executing asynchronous functionality calls for two of the elements that form a cluster, and receiving a document object model (DOM) in response to each of the asynchronous functionality calls. The DOMs are compared to determine whether a difference exists between the DOMs based on a predetermined threshold. If no difference exists, execution of the asynchronous functionality calls is ceased.

5 Claims, 6 Drawing Sheets

100

400

COMPARING WEBPAGE ELEMENTS HAVING ASYNCHRONOUS FUNCTIONALITY

BACKGROUND

The present disclosure relates generally to analyzing webpages having asynchronous functionality. More specifically, the techniques described herein include executing asynchronous webpage elements and comparing resulting document object models.

A web crawler is a software program that browses the web for some specified purpose, such as indexing data and performing updates. Crawlers may save web pages they visit which are then processed by a search engine. In some instances, web crawlers can be used for validating links, as well as for web scraping.

SUMMARY

In one embodiment, a method for comparing webpage elements is described herein. The method includes clustering elements in a webpage. The elements have asynchronous functionalities. The method also includes executing asynchronous functionality calls for two of the elements that form a cluster. Document object models (DOMs) are received in response to each of the asynchronous functionality calls. The DOMs are compared to determine whether a difference exists between the DOMs based on a predetermined threshold. Upon determining a difference between the DOMs does not exist, the execution of functionality calls is ceased.

DETAILED DESCRIPTION

The subject matter disclosed herein relates to techniques for comparing results of asynchronous functionality calls to determine when to cease execution of such calls when the results are similar for a group of webpage elements. Webpages may include elements, such as links to other webpages, for example. However, the development of the Internet in general has included webpage elements that have asynchronous functionalities, such as asynchronous JavaScript and extensible markup language (AJAX) functionalities. Asynchronous functionalities initiate calls to a server such that a webpage is dynamically updated. Asynchronous functionalities may be referred to herein as AJAX functionalities, however, other asynchronous functionalities may be implanted in the techniques discussed herein.

Web crawlers may be configured to crawl webpages and determine business logic for a given webpage by initiating elements, such as links, on a webpage to determine the network of webpages for a given website. Web crawlers may account for the effects of executing AJAX calls, such as when new links provided via an AJAX call and/or when hypertext transfer protocol (HTTP) requests are initiated via an AJAX call, by JavaScript execution engines. A JavaScript execution engine may be configured to scan a hypertext markup transfer language (HTML) of a subject webpage and execute elements having AJAX functionalities resulting in an AJAX call to reach other portions of a website. In response to an AJAX call, the website may provide a webpage having a document object model (DOM). In some scenarios, execution of two AJAX calls may provide DOMs that are similar. In this scenario, the execution of more than two AJAX calls may be redundant and may not discover any additional business logic.

For example, the resulting DOM of an AJAX call associated with a "Buy" element of a retail website for a given product may be determined by executing the AJAX call. However, when selecting a different product to buy, the resulting DOM may only differ by the product name, product model, and the like. Therefore, additional execution of AJAX calls is unnecessary for any additional models in order to determine the business logic of the retail website. Additional details are discussed below.

Figure 1:
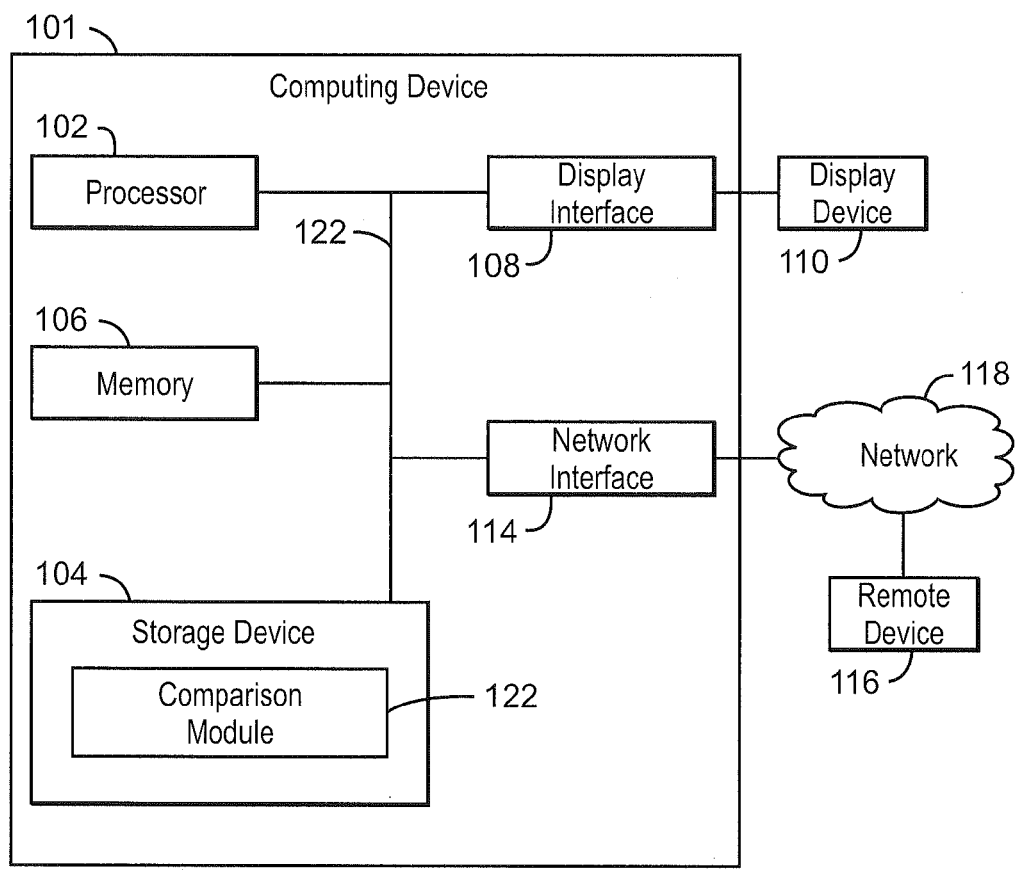
FIG. 1 is a block diagram of a computing system configured to compare results of asynchronous calls from elements of a webpage in accordance with an embodiment.

FIG. 1 is a block diagram of a computing system configured to compare results of asynchronous calls from elements of a webpage. The computing system 100 may include a computing device 101 having a processor 102, a storage device 104 comprising a non-transitory computer-readable medium, a memory device 106, a display interface 108 communicatively coupled to a display device 110. The computing device 101 may include a network interface 114 communicatively coupled to a remote device 116 via a network 118. The storage device 104 may include a comparison module 112 configured to compare results of asynchronous calls from elements of a webpage. In embodiments, the comparison module 112 may be used by a web crawler (not shown) to determine when to stop executing AJAX calls of a given webpage hosted on the remote device 116. In some embodiments, the display interface 108 may enable a user of the computing system 101 to view the comparison between DOMs resulting in AJAX calls. The display device 110 may be an external component to the computing device 101, an integrated component of the computing device 101, or any combination thereof.

The comparison module 112 may be logic, at least partially comprising hardware logic. In embodiments, the graph module 112 may be implemented as instructions executable by a processing device, such as the processor 102. The instructions may direct the processor 102 to cluster elements in a webpage having asynchronous functionality, and execute asynchronous functionality calls two elements of a cluster. In response to each asynchronous functionality call, a DOM is received. The instructions may direct the processor 102 to compare the DOMs to determine whether a difference exists between the DOMs based on a predetermined threshold. If a difference does not exist, the instructions may direct the processor 102 to cease execution of the asynchronous functionality calls.

The processor 102 may be a main processor that is adapted to execute the stored instructions. The processor 102 may be a single core processor, a multi-core processor, a computing cluster, or any number of other configurations. The memory unit 106 can include random access memory, read only memory, flash memory, or any other suitable memory systems. The main processor 102 may be connected through a system bus 122 to components including the memory 106, the storage device 104, and the display interface 108.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
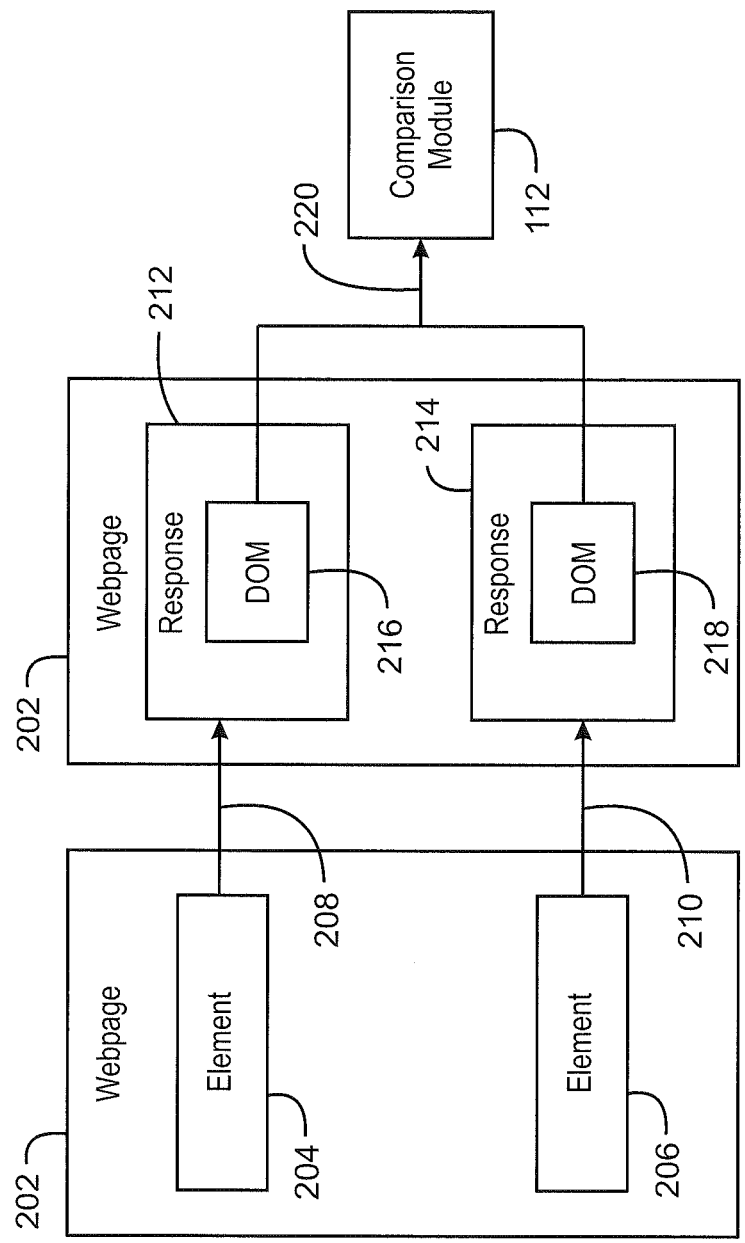
FIG. 2 is a block diagram of a system for comparing document object models from asynchronous functionality calls in accordance with an embodiment.

FIG. 2 is a block diagram of a system for comparing document object models from asynchronous functionality calls. As illustrated in FIG. 2, a webpage 202 may have elements 204, 206. The elements include asynchronous functionalities, such as AJAX functionalities, configured to execute a call to a server to dynamically update the webpage 202, as indicated by the arrows 208 and 210. In response to the AJAX calls, the webpage is updated with a response 212 associated with the element 204, and a response 214 associated with the element 206. Each of the responses 212, 214 may have a DOM 216, 218. As discussed above, the comparison module 112 may be configured to compare the DOMs 216, 218 to determine whether a difference exists between the DOMs 216, 218, as indicated by the arrow 220.

In embodiments, the comparison may be based on a threshold. The threshold may be configurable by an operator in some embodiments. For example, the threshold may be configured such that textual changes in a given DOM may be determined as insignificant by the comparison model 112.

Figure 3:
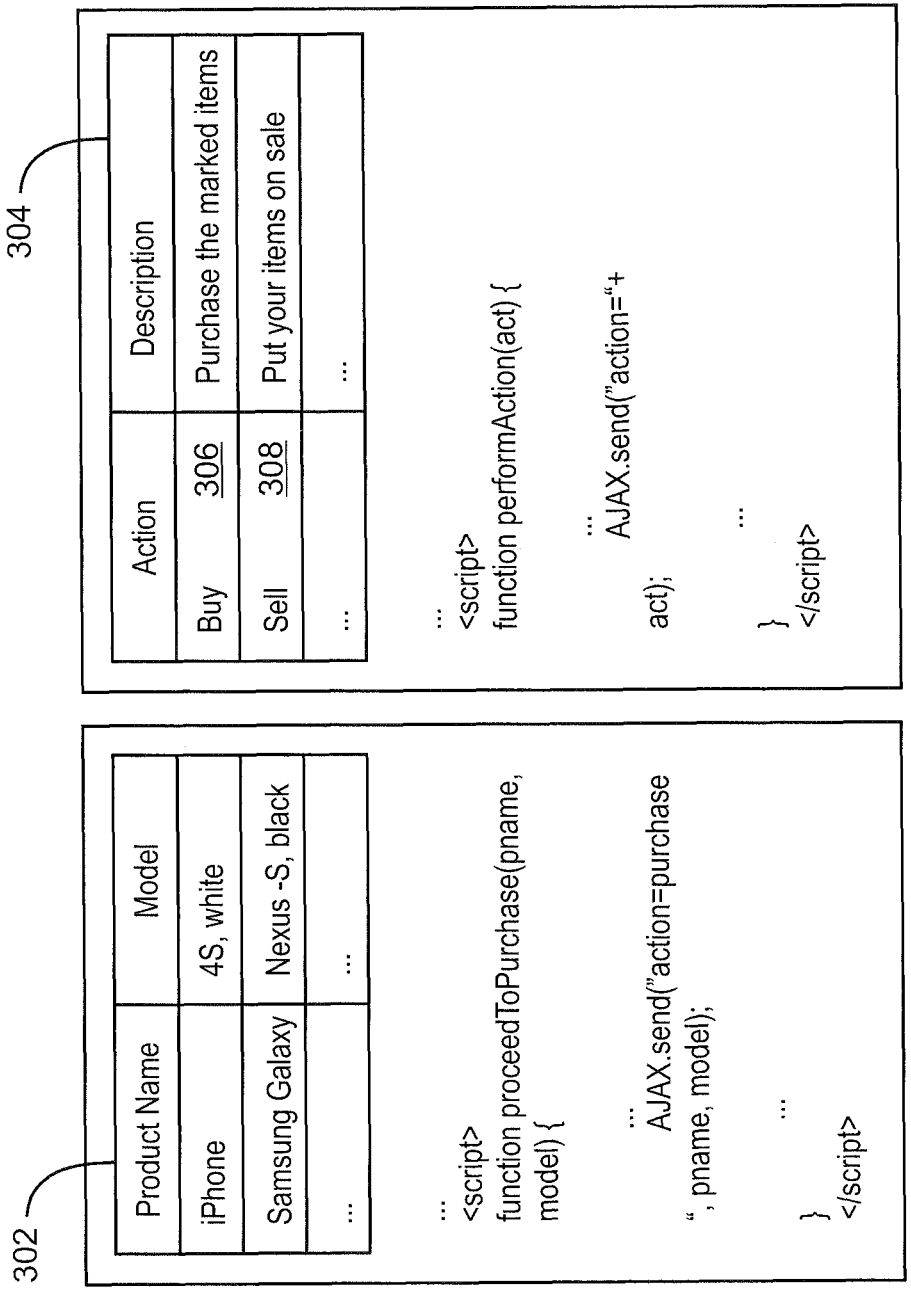
FIG. 3A illustrates a document object model wherein comparison between different executions of asynchronous functionality calls produce redundant results in accordance with an embodiment.
FIG. 3B illustrates a document object model wherein comparison between different executions of asynchronous functionality calls does not produce redundant results in accordance with an embodiment.

FIG. 3A illustrates a document object model wherein comparison between different executions of asynchronous functionality calls produces redundant results. Continuing in the example above, FIG. 3A illustrates a DOM wherein two different AJAX calls may be initiated and wherein the only difference in the resulting respective DOMs may be the product name (pname) and product model (pmodel). The comparison module 112 may determine that the resulting DOM's are not different, and further execution of AJAX calls using other product names and product models indicated in the table 302 is not necessary. Therefore, comparison module 112 may cease to execute asynchronous calls for elements belonging to a same cluster. As discussed in more detail below, clusters may be determined such that a projection may be performed once differences have been determined to be insignificant based on the threshold.

FIG. 3B illustrates a document object model wherein comparison between different executions of asynchronous functionality calls does not produce redundant results. In this example, each action in the table 304 is an element having asynchronous functionality. In contrast to FIG. 3A, the table 304 in FIG. 3A includes actions wherein the resulting DOM may be different when executing an AJAX call associated with a "Buy" action 306, as opposed to an AJAX call associated with a "Sell" action 308. Therefore, the comparison model 112 may continue to execute AJAX calls for each type of action in the table 304.

Figure 4:
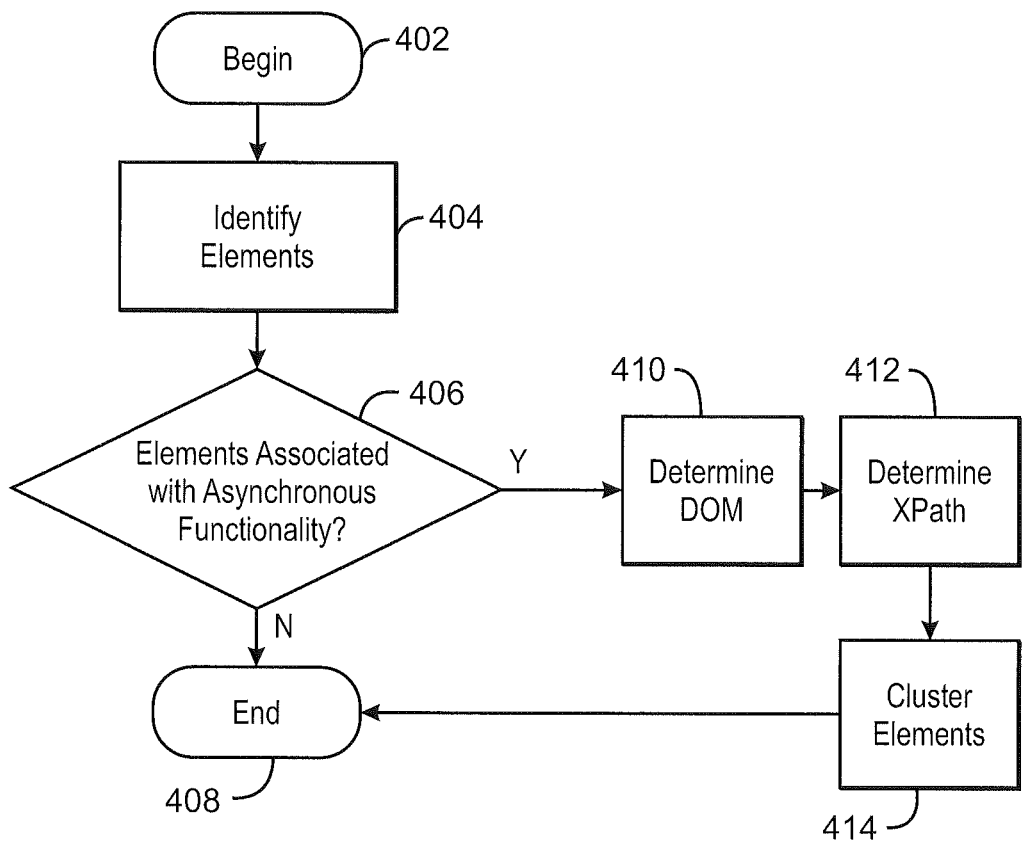
FIG. 4 is a flowchart illustrating clustering of elements having asynchronous functionalities in accordance with an embodiment.

FIG. 4 is a flowchart illustrating clustering of elements having asynchronous functionalities. As discussed above, elements of a webpage may be clustered such that determinations of differences for at least two elements of a given cluster may be projected to the other elements of the cluster, thereby reducing execution of AJAX calls overall. Clustering may include grouping the webpage elements in a HTML DOM based on an extensible markup language (XML) document query path (XPath) extending from a root HTML to a DOM element corresponding to each webpage element.

As illustrated in FIG. 4, the clustering may begin at 402. Elements of a webpage may be identified at 404. A determination may be made regarding whether the elements identified at block 404 are associated with asynchronous functionalities at 406. If the identified elements are not associated with asynchronous functionalities, then the process may end at block 408. If the identified elements are associated with asynchronous functionalities, a DOM may be determined for each of the identified elements at block 410, and an XPath from an HTML root extending to a given DOM element corresponding to each webpage element is determined at block 412. Based on the XPath, elements may be clustered such that every element within the XPath is grouped into the same cluster at block 414. Once the clustering has been performed, the comparison module 112 discussed above may execute AJAX calls and compare resulting DOMs to reduce redundant calls within a given cluster.

Figure 5:
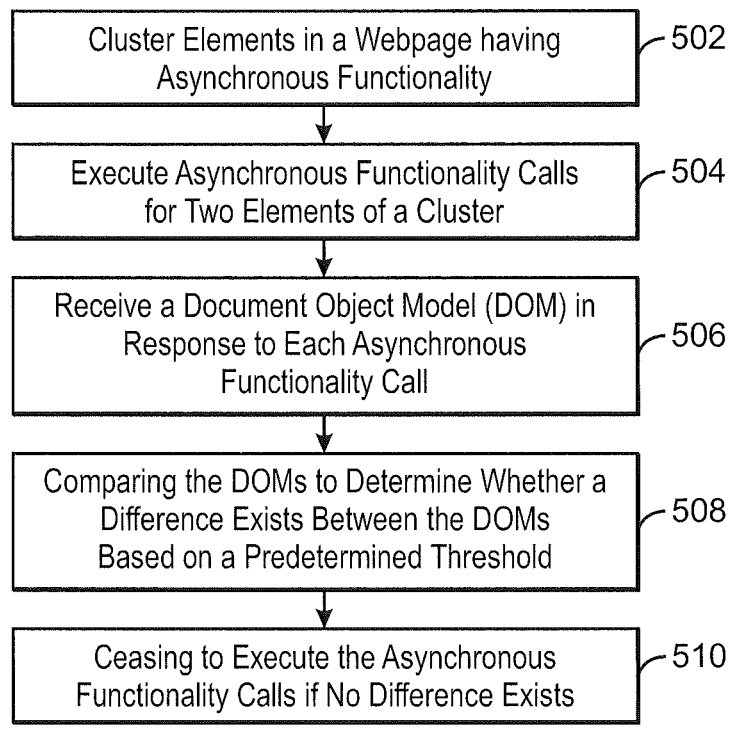
FIG. 5 is a block diagram illustrating a method of comparing document object models to determine whether to cease execution of asynchronous functionality calls in accordance with an embodiment.

FIG. 5 is a block diagram illustrating a method of comparing document object models to determine whether to cease execution of asynchronous functionality calls. As illustrated in FIG. 5, the method 500 may cluster, at block 502, elements in a webpage having asynchronous functionality, and asynchronous functionality calls may be executed at block 504. A DOM may be received in response to each asynchronous functionality call at block 506. The DOMs may be compared, at block 508, to determine whether a difference exists between the DOMs based on a predetermined threshold. If no difference exists, the asynchronous functionality calls are ceased at block 510.

As will be appreciated by one skilled in the art, embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for embodiments may be written in any combination of one or more programming languages, including an object oriented programming language such as Java, Smalltalk, C++, JavaScript, objective C and C#, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
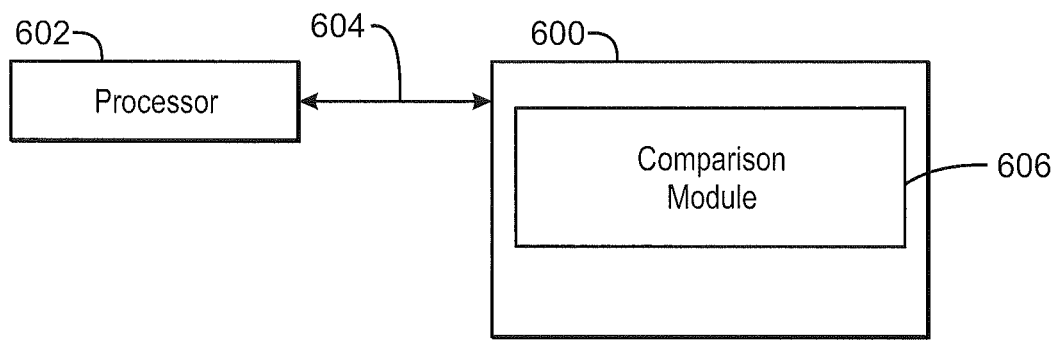
FIG. 6 is a block diagram depicting an example of a tangible, non-transitory computer-readable medium that can be used to form a graph configured to compare results of asynchronous calls from elements of a webpage in accordance with an embodiment.

FIG. 6 is a block diagram depicting an example of a tangible, non-transitory computer-readable medium that can be used to form a graph configured to compare results of asynchronous calls from elements of a webpage. The tangible, non-transitory, computer-readable medium 600 may be accessed by a processor 602 over a computer bus 604. Furthermore, the tangible, non-transitory, computer-readable medium 600 may include computer-executable instructions to direct the processor 602 to perform the steps of the current method.

The various software components discussed herein may be stored on the tangible, non-transitory, computer-readable medium 600, as indicated in FIG. 6. For example, a comparison module 606 may be configured to cluster elements in a webpage having asynchronous functionality, and execute asynchronous functionality calls for two elements of a cluster. Document object model (DOM) received in response to each asynchronous functionality call are compared the DOMs to determine whether a difference exists between the DOMs based on a predetermined threshold, and, if not, the comparison module 606 ceases to execute the asynchronous functionality calls The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device, comprising:
   a storage device; and
   a processor;
   the storage device having instructions that when executed by the processor, cause the computing device to:
   cluster elements in a webpage having asynchronous functionality, wherein clustering the elements comprises grouping the webpage elements in a hypertext markup language (HTML) document object model (DOM) based on an extensible markup language (XML) document query path extending from a root HTML to a DOM element corresponding to each webpage element;

execute asynchronous functionality calls for two of the elements that form a cluster;

receive a corresponding DOM in response to each of the asynchronous functionality calls;

compare DOMs including the corresponding DOM to determine whether a difference exists between the DOMs based on a predetermined threshold;

upon determining a difference exists between the DOMs and the difference exceeds the predetermined threshold, associate the asynchronous functionality calls and the DOMs received in response to the asynchronous functionality calls with elements of a business function of the cluster, wherein the instructions cause the computing device to project the business function of the cluster for all webpage elements of the cluster without having executed Asynchronous JavaScript and extensible markup language (AJAX) calls for all the webpage elements in the cluster; and upon determining no difference exists, cease to execute the asynchronous functionality calls.

2. The computing device of claim 1, wherein the asynchronous functionality comprises AJAX functionality wherein the elements are clickable elements of the webpage such that when the element is clicked a corresponding AJAX call is initiated.

3. The computing device of claim 1, wherein a DOM received in response to an AJAX call comprises links to other webpages, wherein the links to other webpages are elements of the business function.

4. The computing device of claim 1, wherein the instructions cause the computing device to determine security vulnerabilities in the webpage based on elements of the business function for the cluster.

5. The computing device of claim 2, wherein the instructions cause the computing device to continue to execute AJAX calls associated with elements of the cluster when the difference between the compared DOMs is above the predetermined threshold.

* * * * *